(12) United States Patent
Gu et al.

(10) Patent No.: US 7,235,159 B2
(45) Date of Patent: *Jun. 26, 2007

(54) METHODS FOR PRODUCING AND USING CATALYTIC SUBSTRATES FOR CARBON NANOTUBE GROWTH

(75) Inventors: Gang Gu, Palo Alto, CA (US);
Lawrence Pan, Los Gatos, CA (US);
Lian Zhang, Cupertino, CA (US)

(73) Assignee: Molecular Nanosystems, Inc., Palo Alto, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/943,321

(22) Filed: Sep. 16, 2004

(65) Prior Publication Data

US 2005/0112052 A1 May 26, 2005

Related U.S. Application Data

(60) Provisional application No. 60/503,919, filed on Sep. 17, 2003.

(51) Int. Cl.
| | |
|---|---|
| *C23C 11/34* | (2006.01) |
| *C23C 14/24* | (2006.01) |
| *C23C 14/30* | (2006.01) |
| *C25D 15/00* | (2006.01) |
| *B01J 23/28* | (2006.01) |
| *B01J 23/30* | (2006.01) |
| *B01J 23/745* | (2006.01) |
| *B01J 23/75* | (2006.01) |
| *B01J 23/755* | (2006.01) |

(52) U.S. Cl. ............... 204/192.1; 204/192.12; 204/192.15; 205/109; 423/447.3; 427/226; 427/228; 427/229; 427/248.1; 427/249.1; 427/255.19; 427/372.2; 427/383.1; 427/596; 427/597; 502/305; 502/325; 502/337; 502/338

(58) Field of Classification Search ............ 423/447.3; 502/305, 325, 337, 338; 427/249.1, 229, 427/255.19, 383.1, 226, 228, 248.1, 372.2, 427/596, 597; 204/192.11, 192.12, 192.15; 205/109

See application file for complete search history.

(56) References Cited

U.S. PATENT DOCUMENTS 5,500,200 A    3/1996   Mandeville et al.

(Continued)

FOREIGN PATENT DOCUMENTS

EP    1 134 304 A2    9/2001

(Continued)

N. R. Franklin, H. Dai, An Enhanced CVD Approach to Extensive Nanotube Networks with Directionality, Advanced Materials, vol. 12, Issue 12, pp. 890-894, 2000.*

(Continued)

*Primary Examiner*—Wayne A. Langel
(74) *Attorney, Agent, or Firm*—Carr & Ferrell LLP (57) ABSTRACT

A catalyst material for carbon nanotube synthesis includes a uniform dispersion of host particles on a substrate. The host particles themselves include catalyst nanoparticles that are effective to catalyze nanotube syntheses reactions and provide nucleation sites. Methods for preparing catalyst materials include co-sputtering a catalytic species and a host species to form a precursor thin film on a substrate, followed by an oxidation reaction of the precursor thin film in air. The precursor thin film can be patterned on the substrate to limit the locations of the catalyst material to well-defined areas. Methods for nanotube synthesis employ CVD in conjunction with the catalyst materials of the invention. During the synthesis, the catalyst nanoparticles catalyze carbon nanotubes to grown from a carbon-containing gas.

15 Claims, 7 Drawing Sheets

U.S. PATENT DOCUMENTS

| | | | |
|---|---|---|---|
| 5,872,422 A | 2/1999 | Xu et al. |
| 6,156,256 A | 12/2000 | Kennel |
| 6,232,706 B1 | 5/2001 | Dai et al. |
| 6,297,592 B1 | 10/2001 | Goren et al. |
| 6,333,016 B1 | 12/2001 | Resasco et al. |
| 6,346,189 B1 | 2/2002 | Dai et al. |
| 6,401,526 B1 | 6/2002 | Dai et al. |
| 6,407,922 B1 | 6/2002 | Eckblad et al. |
| 6,432,320 B1 | 8/2002 | Bonsignore et al. |
| 6,482,520 B1 | 11/2002 | Tzeng |
| 6,515,339 B2 | 2/2003 | Shin et al. |
| 6,528,020 B1 | 3/2003 | Dai et al. |
| 6,596,187 B2 | 7/2003 | Coll et al. |
| 6,652,958 B2 | 11/2003 | Tobita |
| 6,695,974 B2 | 2/2004 | Withers et al. |
| 6,749,827 B2 | 6/2004 | Smalley et al. |
| 6,756,025 B2 | 6/2004 | Colbert et al. |
| 6,756,026 B2 | 6/2004 | Colbert et al. |
| 6,824,755 B2 | 11/2004 | Colbert et al. |
| 6,856,016 B2 | 2/2005 | Searls et al. |
| 6,900,580 B2 | 5/2005 | Dai et al. |
| 6,921,707 B1 * | 7/2005 | Zinn et al. ............... 438/496 |
| 2001/0019238 A1 | 9/2001 | Dai et al. |
| 2002/0084410 A1 | 7/2002 | Colbert et al. |
| 2002/0085968 A1 | 7/2002 | Smalley et al. |
| 2002/0088938 A1 | 7/2002 | Colbert et al. |
| 2002/0090330 A1 | 7/2002 | Smalley et al. |
| 2002/0090331 A1 | 7/2002 | Smalley et al. |
| 2002/0092983 A1 | 7/2002 | Cobert et al. |
| 2002/0092984 A1 | 7/2002 | Colbert et al. |
| 2002/0094311 A1 | 7/2002 | Smalley et al. |
| 2002/0096634 A1 | 7/2002 | Colbert et al. |
| 2002/0098135 A1 | 7/2002 | Smalley et al. |
| 2002/0102196 A1 | 8/2002 | Smalley et al. |
| 2002/0102201 A1 | 8/2002 | Colbert et al. |
| 2002/0109086 A1 | 8/2002 | Colbert et al. |
| 2002/0109087 A1 | 8/2002 | Colbert et al. |
| 2002/0127162 A1 | 9/2002 | Smalley et al. |
| 2002/0127169 A1 | 9/2002 | Smalley et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0159943 A1 | 10/2002 | Smalley et al. |
| 2002/0178846 A1 | 12/2002 | Dai et al. |
| 2002/0179434 A1 | 12/2002 | Dai et al. |
| 2003/0010910 A1 | 1/2003 | Colbert et al. |
| 2003/0049444 A1 | 3/2003 | Dai et al. |
| 2003/0066960 A1 | 4/2003 | Colbert et al. |
| 2003/0068432 A1 | 4/2003 | Dai et al. |
| 2003/0075682 A1 | 4/2003 | Colbert et al. |
| 2003/0106998 A1 | 6/2003 | Colbert et al. |
| 2003/0117770 A1 | 6/2003 | Montgomery et al. |
| 2004/0101468 A1 | 5/2004 | Liu et al. |
| 2004/0144970 A1 | 7/2004 | Wang et al. |
| 2004/0144972 A1 | 7/2004 | Dai et al. |
| 2004/0147037 A1 | 7/2004 | Dai et al. |
| 2004/0149209 A1 | 8/2004 | Dai et al. |
| 2004/0152240 A1 | 8/2004 | Dangelo |
| 2004/0194705 A1 | 10/2004 | Dai et al. |
| 2004/0265209 A1 | 12/2004 | Colbert et al. |
| 2004/0265489 A1 | 12/2004 | Dubin |
| 2004/0266063 A1 | 12/2004 | Montgomery et al. |
| 2004/0266065 A1 | 12/2004 | Zhang et al. |
| 2005/0037204 A1 | 2/2005 | Osiander et al. |
| 2005/0046017 A1 | 3/2005 | Dangelo |

FOREIGN PATENT DOCUMENTS

| | | |
|---|---|---|
| WO | WO 95/10481 | 4/1995 |
| WO | WO 00/09443 | 2/2000 |

OTHER PUBLICATIONS

E. Joselevich, C. M. Lieber, Vectorial Growth of Metallic and Semiconducting Single-Wall Carbon Nanotubes, Nano Letters, 2 (10), 1137-1141, 2002; Web Release Date: Aug. 30, 2002.*

Ren, Z. et al., "Synthesis of Large Arrays of Well-Aligned Carbon Nanotubes on Glass," Science, Nov. 6, 1998, vol. 282, pp. 1105-1107.

Kim, P. et al., "Thermal transport measurement of individual multiwalled nanotubes," Phys. Rev. Lett. 87 (21), 215502 (2001).

Kong, J. et al., "Synthesis of individual single-walled carbon nanotubes on patterned silicon wafers," Nature, Oct. 29, 1998, vol. 395, pp. 878-881.

Li, W.Z. et al., "Large-Scale Synthesis of aligned Carbon Nanotubes," Science, Dec. 6, 1996, vol. 274, pp. 1701-1703.

Hafner, J. H. et al., "Direct Growth of Single-Walled Carbon Nanotube Scanning Probe Microscopy Tips," J. Am. Chem. Soc., 1999, vol. 121, pp. 9750-9751.

Hafner, J. H. et al., "Growth of nanotubes for probe microscopy tips," Nature, Apr. 29, 1999, vol. 398, pp. 761-762.

Cassell, A. M. et al., "Directed Growth of Free-Standing Single-Walled Carbon Nanotubes," J. Am. Chem. Soc., 1999, vol. 121, pp. 7975-7976.

Dai, H. et al., "Controlled Chemical Routes to Nanotube Architectures, Physics, and Devices," J. Phys. Chem. B, 1999, vol. 103, pp. 11246-11255.

Dai, H. et al., "Nanotubes as nanoprobes in scanning probe microscopy," Nature, Nov. 14, 1996, vol. 384.

U.S. Appl. No. 11/128,928, Gang Gu, Methods for Producing and Using Catalytic Substrates for Carbon Nanotude Growth, filed May 12, 2005.

U.S. Appl. No. 11/124,005, Lawrence S. Pan, Growth of Carbon Nanotubes to Join Surfaces, filed May 6, 2005.

U.S. Appl. No. 11/107,599, Lawrence S. Pan, Nanotube Surface Coatings for Improved Wettability, filed Apr. 14, 2005.

* cited by examiner

METHODS FOR PRODUCING AND USING CATALYTIC SUBSTRATES FOR CARBON NANOTUBE GROWTH

CROSS-REFERENCE TO RELATED APPLICATIONS

This application claims the benefit of U.S. Provisional Application No. 60/503,919 filed Sep. 17, 2003, titled "Method of Controlling Carbon Nanotube Growth" which is incorporated herein by reference.

STATEMENT REGARDING FEDERALLY SPONSORED RESEARCH OR DEVELOPMENT

This invention was made with United States Government support under Cooperative Agreement No. 70NANB2H3030 awarded by the Department of Commerce's National Institute of Standards and Technology. The United States has certain rights in the invention.

BACKGROUND OF THE INVENTION

1. Field of the Invention

The present invention relates generally to the field of nanotechnology and more particularly substrates for catalyzing the growth of carbon nanotubes, methods for preparing the substrates, and methods employing the substrates to grow carbon nanotubes.

2. Description of the Prior Art

A nanotube is a molecule composed of carbon atoms formed in the shape of hollow cylinder. The unique structural, mechanical, and electrical properties of nanotubes make them potentially useful for use in microscopic electrical, mechanical, and electromechanical devices. Nanotubes can be utilized individually or as an ensemble to build devices. For instance, individual nanotubes have been used as tips for scanning probe microscopy and as mechanical nano-tweezers. Ensembles of nanotubes have been used for field emission based flat-panel displays, and it has been suggested that bulk quantities of nanotubes may be used as a high-capacity hydrogen storage media.

Multi-walled nanotubes consist of multiple nanotubes of different diameters nested together, one inside another. For many applications, however, single-walled carbon nanotubes (SWNT) are desired. For example, SWNT-based miniature sensors have been shown to be sensitive gas sensors and selective biosensors. Additionally, individual semiconducting SWNTs have been made into field effect transistors.

Carbon nanotubes are typically produced by methods such as arc-discharge, laser ablation or chemical vapor deposition (CVD). The first two methods rely on evaporating carbon atoms from solid carbon sources at a very high temperature. These techniques are inherently disadvantageous because solid carbon vaporization via electric arc or laser apparatus is both costly and difficult to operate on commercial or industrial scales. The CVD process involves heating a catalyst material to a high temperature in a reactor and flowing a hydrocarbon gas through the reactor for a period of time. The key parameters in nanotube CVD growth include the hydrocarbon species in the gas, the catalysts, and the reaction temperature.

Typical catalysts for CVD nanotube growth are transition-metal nanoparticles, comprising elements such as iron, nickel, or cobalt, formed on a host material such as alumina. Notably, iron, cobalt and nickel are also the favored catalytic metals used in laser ablation and arc-discharge. For example, U.S. Pat. No. 5,500,200 discloses a method for the bulk production of multi-walled nanotubes using a catalyst prepared from iron acetylacetonate deposited on a host of fumed alumina particles with an average particle size of about 10 nm.

In another example, U.S. Pat. No. 6,346,189 discloses a CVD method that uses an island of a catalyst disposed on a substrate with a carbon nanotube extending form the island. Also, U.S. Pat. No. 6,333,016 discloses a method for producing carbon nanotubes by contacting a carbon containing gas with metallic catalytic particles, where the catalytic particles contain at least one metal from Group VIII and at least one metal from Group VIB of the Periodic Table of the Elements.

Additionally, U.S. Pat. No. 6,596,187 discloses a method of forming a nano-supported sponge catalyst on a substrate. In this method a catalytic metallic element and a structural metallic element are both deposited on the substrate to form a mixed metal alloy layer. The mixed metal alloy layer is then etched with an etchant to oxidize the catalytic metallic element and the structural metallic element and to remove at least a portion of the structural metallic element.

Ren et.al. disclose a method for producing nanotube arrays by first depositing a thin nickel layer onto mesoporous silica by radio frequency magnetron sputtering followed by plasma-enhanced hot filament CVD to synthesize the nanotubes. The nanotubes produced by this method, however, are generally multi-walled. See Science 282, 1105-1102 (1998), which is incorporated herein by reference.

Atomic force microscopy (AFM), a form of scanning probe microscopy, has been a powerful tool for a wide range of fundamental research and technological applications. A critical limitation of atomic force microscopy is the size and the shape of the scanning probe tip which dictate the lateral resolution and fidelity of AFM images. U.S. Pat. Nos. 6,346,189 and 6,401,526 disclose methods for providing AFM probe tips enhanced with carbon nanotubes.

The methods described above, however, do not provide a controlled method of producing a homogenous catalyst, nor do they provide a readily controllable yield of carbon nanotube growth. Therefore, what is needed are methods for producing homogenous catalysts and for readily controlling carbon nanotube growth.

SUMMARY

A catalyst material is provided for carbon nanotube synthesis. The catalyst material comprises a uniform dispersion of host particles on a substrate, where the host particles include catalyst nanoparticles exposed on the surfaces of the host particles that are effective to catalyze nanotube syntheses reactions. The host particles are formed of a material (a host species) such as aluminum oxide, and the catalyst nanoparticles are formed of a material (a catalyst species) such as Fe or a Fe—Mo alloy. More generally, the host species can include any of Al, aluminum oxide, Mg, magnesium oxide, Si, silicon oxide, or a combination thereof. Likewise, the catalytic species can include any of Fe, Co, Ni, Mo, W, or a combination thereof, or an oxide of Fe, Co, Ni, Mo, W, or an oxide of a combination thereof. The catalytic species can also comprise a metal from Group VIII of the Periodic Table and a metal from Group VIB of the Periodic Table.

According to an embodiment of the invention, a method for preparing the catalyst material comprises forming a precursor layer on a substrate by co-depositing a catalytic species and a host species, and transforming the precursor layer, for example by annealing in air, to form a uniform dispersion of host particles including catalyst nanoparticles. Transforming the precursor layer, in some embodiments, includes both oxidizing and heating the precursor layer, while in other embodiments only heating the precursor layer is required. In some embodiments, forming the precursor layer includes controlling a thickness thereof according to a deposition time. Also, in some embodiments, forming the precursor layer includes controlling a composition thereof according to relative surface areas for the catalytic and host species on a co-sputtering target. Also, forming the precursor layer can include patterning the precursor layer.

In various embodiments of the invention co-depositing can include co-sputtering, co-evaporation, electro-deposition, laser ablation, or arc evaporation. Transforming the precursor layer can also include oxygen plasma etching or a UV ozone treatment. In those embodiments in which transforming the precursor layer includes annealing, the annealing can be carried out at a temperature in the range of about 400° C. to about 900° C., and for a period of about 5 minutes to about 30 minutes.

According to another embodiment of the invention, a method of synthesizing carbon nanotubes comprises forming a precursor layer on a substrate by co-depositing a catalytic species and a host species, such as a metal oxide, transforming the precursor layer at a first elevated temperature in a reactor to form a catalytic material on the substrate, and passing a carbon-containing gas over the catalytic material on the substrate in the reactor at a second elevated temperature for a period of time. In some instances the first and second temperatures are the same. In some embodiments transforming the precursor layer is performed in air, in some the first elevated temperature is in a range of about 400° C. to about 900° C., in some the period of time is in a range of about 5 minutes to about 30 minutes, and in some the carbon-containing gas includes a hydrocarbon such as methane, ethylene, or acetylene. The reactor can be a tube reactor.

Still other embodiments of the invention are directed to a method of fabricating an AFM probe including a carbon nanotube. Exemplary methods comprise forming a precursor layer on the AFM probe by co-depositing a catalytic species and a host species, transforming the precursor layer at a first elevated temperature to form a catalytic material on the AFM probe, and passing a carbon-containing gas over the AFM probe at a first elevated temperature for a period of time. In these embodiments the host species can include a metal oxide.

DETAILED DESCRIPTION OF THE INVENTION

The present invention is directed to methods for preparing catalyst materials on substrates, and to methods of using the catalyst materials to grow carbon nanotubes. An exemplary catalyst material includes a uniform dispersion of host particles having catalyst nanoparticles on the surfaces thereof. Exemplary methods for nanotube growth employ CVD in conjunction with the catalyst materials of the invention. In these methods the substrate, including the catalyst material, is placed into a reactor and heated to a high temperature. A carbon-containing gas is then passed through the reactor for a period of time. Nanotube growth is catalyzed from the carbon-containing gas by the catalyst nanoparticles. Key parameters in CVD nanotube growth include the composition of the carbon-containing gas, the reaction temperature, and aspects of the catalyst material such as the composition of the nanoparticles, the size of the host particles, and the density of the host particles on the substrate.

An embodiment of a reactor for implementing methods of the present invention includes a heating component and a tube reactor. The tube reactor is made of material, such as quartz, that can withstand a high temperature ranging from several hundred ° C. to 1000° C., preferably over 1200° C., more preferably over 1500° C. The diameter of the tube reactor will depend on the particular application. For example, for small substrates, the diameter may be from less than about 1 inch to over about 2 inches. The diameter may be from about 4 inches to about 5 inches, and preferably to about 6 inches for typical wafer substrates. Larger wafers and scaled-up processes for nanotube synthesis can require tube furnaces with still larger diameters.

Exemplary carbon-containing gases include hydrocarbon gases such as aliphatic hydrocarbons, both saturated and unsaturated, including methane, ethane, propane, butane, hexane, acetylene, ethylene, and propylene. Other exemplary carbon-containing gases include carbon monoxide, oxygenated hydrocarbons such as acetone and methanol, aromatic hydrocarbons such as toluene, benzene and naphthalene, and mixtures of the above. A rate of deposition of carbon on the catalyst material at elevated temperatures will depend on factors including the partial pressures of the carbon-containing gases.

Methods of the present invention can yield either multi-walled or single-walled nanotubes. For promoting multi-walled carbon nanotube growth, exemplary CVD methods employ a growth temperature typically in the range of 550–700° C. with ethylene or acetylene as the carbon-containing gas. Carbon-containing gases for promoting the growth of single-walled carbon nanotubes include methane, ethylene, acetylene and carbon monoxide. As methane is the most stable of these hydrocarbons at high temperatures against self-decomposition, catalytic decomposition of methane by transition-metal catalyst nanoparticles can be the dominant process in SWNT growth.

Suitable temperatures for carbon nanotube growth range from about 500° C. to about 1200° C., preferably from about 700° C. to about 1100° C., more preferably from about 800° C. to about 1000° C., and even more preferably from about 850° C. to about 950° C. Such high temperatures are necessary to form SWNTs that have small diameters and therefore high strain energies. The specific reaction temperature will depend on the particular composition of the catalyst nanoparticles as well as the composition of the carbon-containing gas. It will be understood that the temperature during carbon nanotube growth does not need to be held constant and can be ramped or stepped either up or down during the growth process. It should also be noted that multi-walled nanotubes can be grown at temperatures as low as 150° C. by using plasma-enhanced CVD (PECVD).

Figure 1:
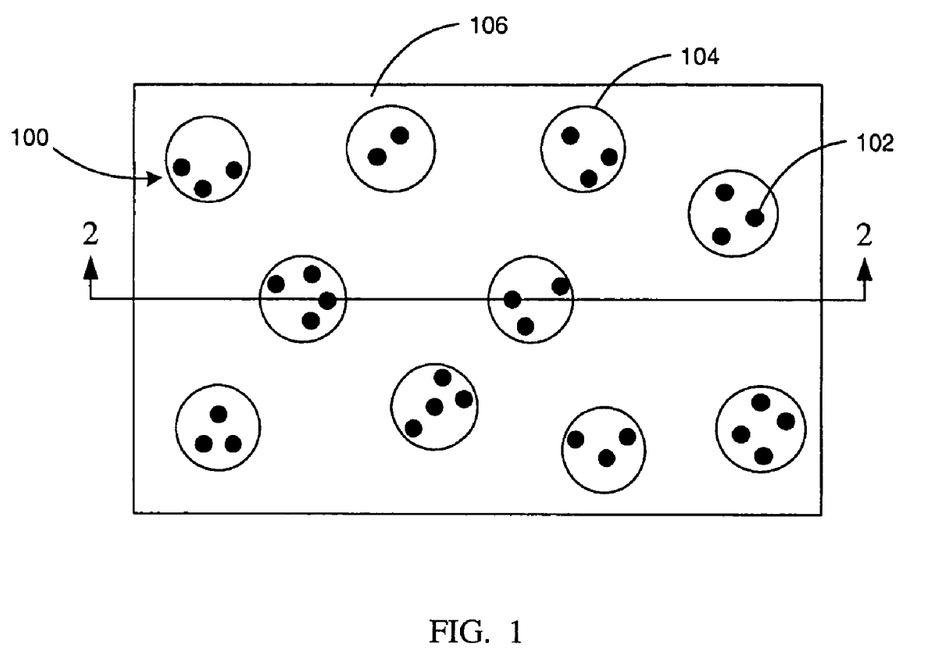
FIG. 1 is a top view of an exemplary catalyst material according to an embodiment of the invention.
Figure 2:
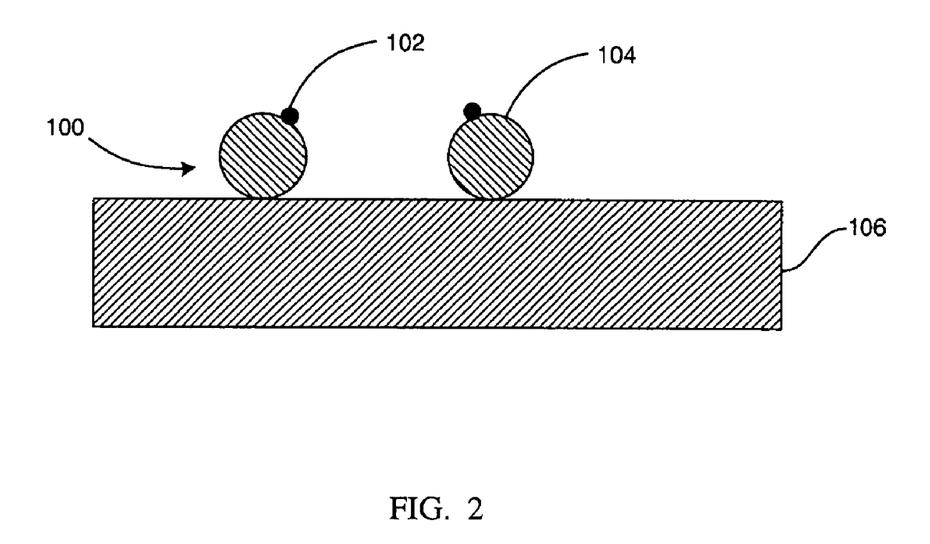
FIG. 2 is a cross-section of the catalyst material of FIG. 1 taken along the line 2—2.

The catalyst material is another factor in the optimization and control of carbon nanotube growth. FIG. 1 shows a top view of a catalyst material 100 of an embodiment of the invention. FIG. 2 shows a cross-section of the catalyst material 100 taken along the line 2—2 in FIG. 1. As can be seen from FIGS. 1 and 2, the catalyst material 100 comprises catalyst nanoparticles 102 disposed on surfaces of host particles 104. The host particles 104 are themselves supported on a substrate 106. The substrate 106 preferably is a material that can withstand the operating temperatures of the nanotube growth reaction without decomposing, reacting with the components of the catalyst material 100, or reacting with gases in the reactor. The substrate 106 can be, for example, Si or silicon dioxide. It will be appreciated that FIGS. 1 and 2 are merely schematic representations and are not meant to accurately represent scale, the density or distribution of the host particles 104, nor the density or distribution of catalyst nanoparticles 102 on the surfaces of the host particles 104, all of which will be described in more detail, below.

Figure 3:
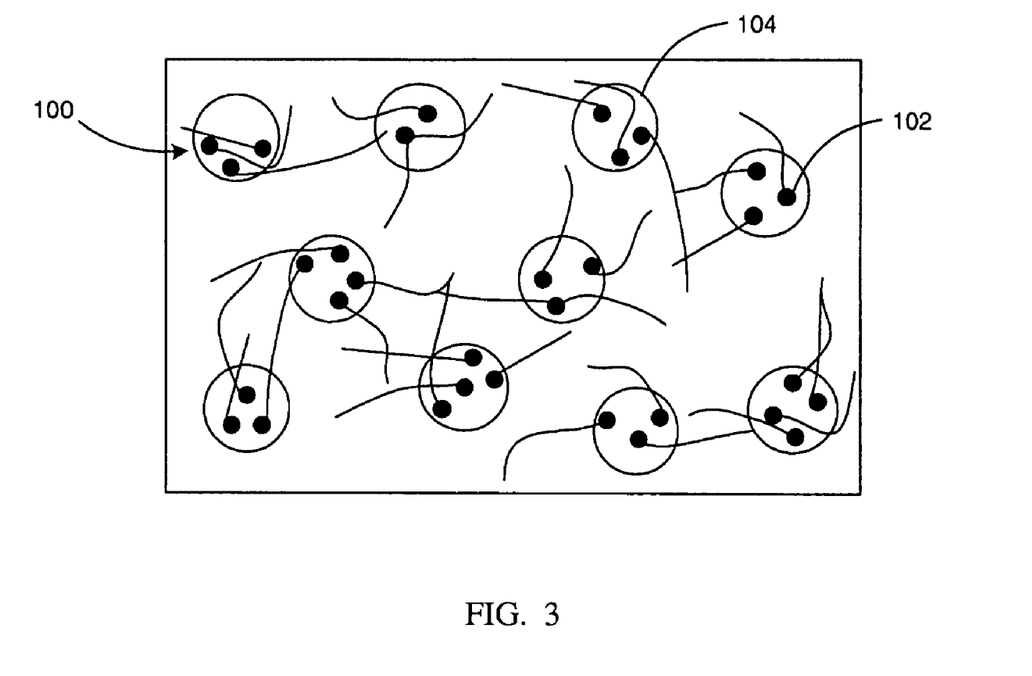
FIG. 3 is a top view of the catalyst material of FIG. 1 after nanotube synthesis according to an embodiment of the invention.

In use, the catalyst nanoparticles 102 both catalyze the growth of the carbon nanotubes and provide sites from which the carbon nanotubes can grow, as shown schematically in FIG. 3. As above, the representations in FIG. 3 are not to scale. The material of the catalyst nanoparticles 102 may be chosen from the transition metals such as Fe, Co, Ni, Ru, Rh, Pd, Ir, Pt, Mo, W, Cr, alloys thereof, and oxides thereof. Preferred materials for the catalyst nanoparticles 102 include Fe, Co, Ni, alloys thereof, and oxides thereof. Another preferred material includes an alloy of Fe and Mo.

The host particles 104 preferably possess a high surface area. Moreover, the host particles 104 should be stable at the high operating temperatures and resist decomposing or sintering. The high surface area of the host particles 104 allows for a high density of catalyst nanoparticles 102, which, in turn facilitates high-yield SWNT growth owing to the high densities of formation sites. Suitable materials for the host particles 104 include Al, Mg, Si and oxides of these elements. Preferred materials for the host particles 104 include Al and aluminum oxide.

As described in more detail below, in some embodiments of the invention the catalyst material 100 is formed by first forming a precursor layer by co-depositing a species for the host particles 104 together with a species for the catalyst nanoparticles 102. Next, the precursor layer is transformed by further processing to form the host particles 104 with the catalyst nanoparticles 102 disposed thereon. For instance, the precursor layer can be formed by co-depositing Fe for the catalyst nanoparticles 102 together with Al for the host particles 104. The precursor layer is then subjected to an oxidation reaction to oxidize the Al to form host particles 104 comprising aluminum oxide. It will be appreciated that during the oxidation reaction, therefore, the Al in the precursor layer reacts to aluminum oxide that balls-up on the surface of the substrate 106 much as water beads on waxed paper. Advantageously, the host particles 104 form evenly on the surface of the substrate 106 so that they are uniformly dispersed thereon. At the same time, the Fe in the precursor layer also coalesces into the catalyst nanoparticles 102, at least some of which are exposed at the surface of the host particles 104.

In these embodiments, another desirable attribute of the materials for the precursor layer is that they posses a strong metal-host interaction, meaning that the species for the catalyst nanoparticles 102 and the species for the host particles 104 are well mixed within a thin film of the two (the thin film is "homogenous"), as opposed to tending to segregate into domains or clusters. This strong metal-host interaction allows the oxidation reaction to yield a high density of catalyst nanoparticles 102 on the host material layer 104 and tends to also prevent the atoms of the catalyst species from aggregating into undesirably large particles that, during nanotube growth, may induce the growth of undesirable graphitic particles or defective multi-walled nanotubes.

One embodiment of the present invention is directed to a method of preparing the catalyst material 100 by: (1) forming the precursor layer on the substrate 106, for example, by co-depositing a homogenous thin film comprising a catalytic species (e.g., one or more elements or compounds to form the catalyst nanoparticles 102) and a host species (e.g., one or more elements or compounds to form the host particles 104); and (2) oxidizing the precursor layer in air to facilitate formation of the host particles 104 together with the catalyst nanoparticles 102.

As noted, suitable catalytic species can comprise more than one metallic element. For example, U.S. Pat. No. 6,333,016, incorporated herein by reference, provides a bimetallic catalyst containing at least one metal from Group VIII of the Periodic Table, such as Co, Ni, Ru, Rh, Pd, Ir, and Pt, and at least one metal from Group VIB of the Periodic Table such as Mo, W and Cr. As also noted, suitable host species can comprise one or more of Al, Mg, Si and their oxides. A precursor layer including a catalytic species having two metallic elements when oxidized, for example by annealing in air, will provide bimetallic catalyst nanoparticles 102 with the host particles 104.

Co-deposition of the precursor layer by a sputtering process, in some embodiments, can employ multiple sputtering targets. In some embodiments three sputtering targets are used, one target comprising a host species, a second target comprising a first catalytic species, and a third target comprising a second catalytic species. An alternative sputtering process using only a single sputtering target is described below with respect to Example 1.

More generally, the deposition of the precursor layer can be achieved in any number of conventional techniques such as co-sputtering, co-evaporation, electro-deposition, laser ablation, and arc evaporation. In another exemplary embodiment, Fe and Al are co-sputtered onto the substrate 106 by DC sputtering. In still another exemplary embodiment, Fe, Mo, and Al are co-sputtered onto the substrate 106 by DC sputtering. In yet another exemplary embodiment, Fe and Si are co-sputtered onto the substrate 106 by DC sputtering.

Further processing of the precursor layer can include a chemical reaction, such as an oxidation reaction, to transform the precursor layer into the host particles 104 together with the catalyst nanoparticles 102. In an exemplary embodiment, the oxidation reaction is achieved by annealing the substrate 106 with the precursor layer in air at a temperature in the range of from 400° C. to 900° C. for a period of time ranging from 5 to 30 minutes. In alternative embodiments, oxidation is accomplished by oxygen plasma etching or UV ozone treatment. Although oxidation is described herein by way of example, the invention is not limited thereto and other species can also be reacted with the precursor film to form host particles 104 that comprise compounds such as nitrides, carbides, borides, sulfides, halides, intermetallic compounds, and so forth. Further processing of the precursor layer can also comprise a heat treatment under vacuum or under an inert atmosphere such as Ar or nitrogen.

In other embodiments, a precursor layer is formed by co-depositing one or more catalytic species with a metal oxide host species rather than a metallic host species, e.g., Fe and aluminum oxide are co-sputtered onto the substrate 106 by RF sputtering. In some of these embodiments, the host particles 104 having catalyst nanoparticles 102 are formed directly from the RF sputtering process, in which case the subsequent oxidation step is unnecessary. In other such embodiments, the RF sputtering process forms either host particles 104 having the Fe in solid solution, or a precursor film as described above. In these embodiments the substrate 106, with either the host particles 104 or the precursor layer, is heat treated to form the arrangement of host particles 104 and catalyst nanoparticles 102. The heat treating can be performed, for example, in air or under vacuum. In some of these embodiments, the heat treating step is performed in a reactor as a first step in the process of growing nanotubes.

It will be appreciated that aspects of the catalyst material 100, such as the composition, size, and number of the catalyst nanoparticles 102 and the size and number of the host particles 104, can be varied by controlling the catalytic species in the deposition process and by controlling a thickness of the precursor layer. In turn, aspects of the catalyst material 100 such as these will influence the results of nanotube synthesis, as discussed further below. In some embodiments, the composition of the precursor layer, and its thickness, can be specified by controlling the surface areas of the various sputtering targets and by controlling the relative sputtering rates of the targets, respectively. Sputtering rates can be established with a rate monitor, for example.

The targets for the catalytic and host species in the deposition process can have essentially any geometric shape, including circle, oval, square, rectangle, and triangle. The surfaces of the targets are preferably flat so that precise surface areas can be readily determined. The concentration of the catalytic species relative to the host species in the precursor layer is determined by the relative surface areas of the targets and by the relative rates of material erosion from those targets. Obtaining desired relative concentrations from such deposition processes is clear to one of the ordinary skill in the art.

Additionally, in some embodiments, the catalyst material 100 can be patterned onto the substrate 106. A simple pattern, for instance, is a checkerboard design where alternating squares include the catalyst material 100 while the substrate 106 is exposed in the remaining squares. More complex patterns can include electrical contact pads and the like. Patterning can be achieved, for example, through standard photolithography techniques, which will be clear to one of ordinary skill in the art. It will be appreciated that through patterning nanotube growth can be constrained to selected areas on the substrate 106. Accordingly, one can reliably obtain SWNTs emanating from well-defined locations on a large substrate.

Applications for patterning the deposition of the catalyst material 100 include forming devices that include nanotubes in specific locations. Such devices include chemical sensors, electrical components like resistors and transistors, and arrays of field emitter tips to form pixels in displays. In these devices the nanotubes are desired only in well-defined locations, and patterning the catalyst material 100 allows nanotube growth to be constrained to only those well-defined locations.

A yet further embodiment of the present invention is directed to a method of adapting SWNTs for atomic probe microscopy. A method of preparing a carbon nanotube on an AFM probe comprises co-depositing a catalytic species and a host species as a homogenous thin film on the AFM probe; oxidizing the catalytic and host species to provide a catalyst nanoparticle 102 on the AFM probe; heating the AFM probe to an elevated temperature in a reactor; passing a carbon-containing gas at an elevated temperature for a period of time through the reactor; and then cooling the AFM probe to ambient temperature. Accordingly, a carbon nanotube will grow from the catalyst nanoparticle 102 on the AFM probe. The catalytic species can include the transition metal elements noted above, such as Fe, Co and Ni. As also provided above, the host species can be one that provides a strong metal-host interaction, such as Al, Mg and Si, or their respective oxides. Where a metal oxide such as alumina is used as the host species, the subsequent oxidizing step can be optional.

The examples below are provided by way of illustration only and should not be construed as limiting the invention.

EXAMPLE 1

Figure 4:
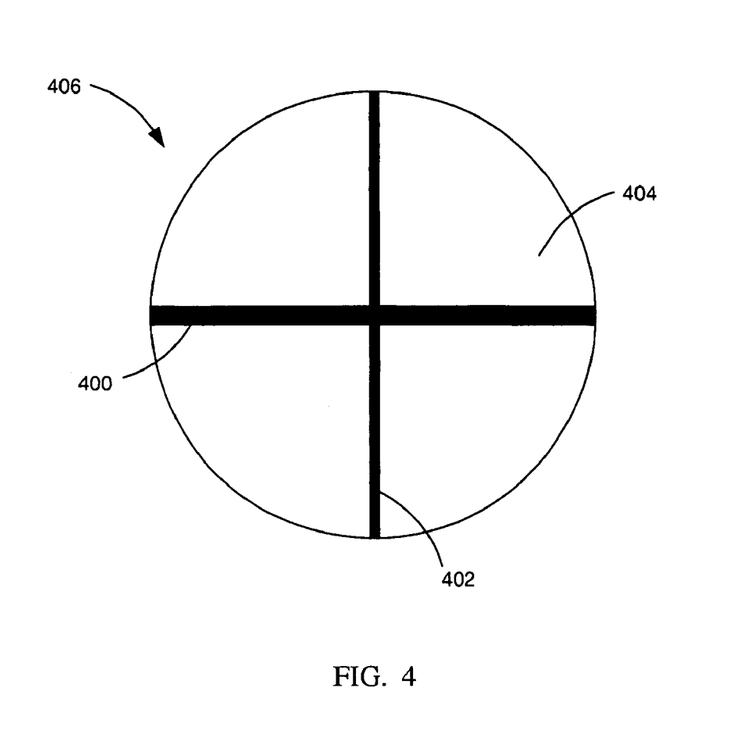
FIG. 4 is a schematic diagram of a co-sputtering target according to an embodiment of the invention.

FIG. 4 is a schematic diagram showing a strip 400 of an Fe foil and a strip 402 of a Mo foil disposed on top of an Al sputtering target 404 with an exemplary diameter of 2.54 cm to form a co-sputtering target 406. In this example the strip 400 of the Fe foil has a width of about 1 mm and the strip 402 of the Mo foil has a width of about 0.5 mm. In one exemplary deposition run, DC sputtering of the co-sputtering target 406 deposited the precursor layer at a rate of 6 nm per minute. Hence, a 3 nm thick precursor layer can be obtained by sputtering for 30 seconds and a 20 nm thick precursor layer can be obtained by sputtering for about 3 minutes. The concentrations of Fe and Mo in the precursor layer are determined by the relative areas of the strips 400, 402 of the co-sputtering target 406.

After sputtering, the precursor layer can be annealed in air at a temperature in a range from about 400° C. to about 900° C. for a period of time ranging from about 5 to about 30 minutes in order to oxidize the Al in the precursor layer to form the host particles 104 and catalyst nanoparticles 102. The catalyst nanoparticles 102 can be a mixture of discrete Fe nanoparticles and discrete Mo nanoparticles, nanoparticles of an Fe—Mo solid solution or intermetallic compound, and/or nanoparticles of the oxides of any of these.

Catalyst materials 100 formed as described above in this example can be used to prepare nanotubes using chemical vapor deposition (CVD) in a 1-inch tube furnace for 10 minutes. Exemplary tube furnace operating conditions include a temperature of 900° C. and 1 standard liter per minute (SLM) $CH_4$ and 0.5 SLM $H_2$. These conditions can also be applied to a wafer-size substrate 106 supporting the catalyst material 100 formed as described above by using a 6-inch tube furnace. The concentrations of Fe and Mo in the precursor layer determine the density and size of the catalyst nanoparticles 102 in the catalyst material 100, and these parameters subsequently influence the yield of the nanotubes from the CVD process.

EXAMPLE 2

Figure 5:
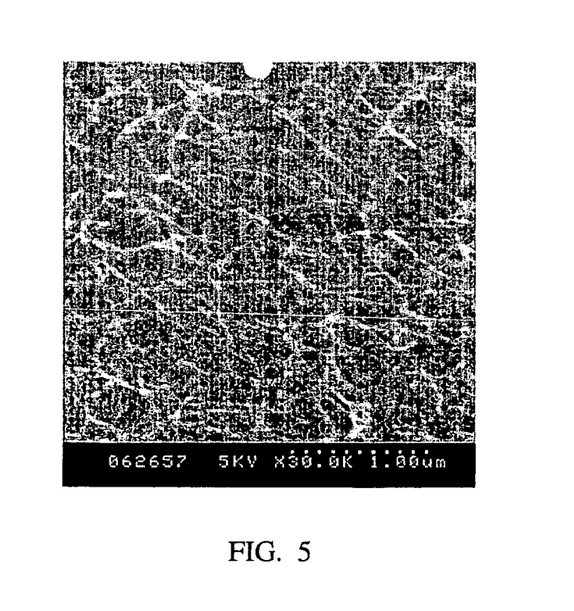
FIG. 5 is an SEM micrograph showing nanotubes synthesized according to an embodiment of the invention.

A 20 nm thick thin film of a Al/Fe/Mo precursor layer was prepared by co-sputtering Al, Fe, Mo in the ratio of 96.1:2.6:1.3 for 3 minutes in a DC sputtering system operating at 50 W power and under a vacuum of $5\times10^{-3}$ mbar. The concentrations of Fe and Mo, 2.6% and 1.3% respectively, were achieved according to the relative areas of Fe and Mo strips 400, 402 in the co-sputtering target 406 of Example 1. The deposited precursor layer was then heated in air at 600° C. for 30 minutes to produce the catalyst material 100. CVD growth of nanotubes under the conditions described in Example 1 on the catalyst material 100 was performed to produce nanotubes as shown in the scanning electron microscope (SEM) micrograph of FIG. 5. This SEM micrograph shows a mat of uniformly distributed and interconnected nanotubes.

EXAMPLE 3

A patterned catalyst material 100 was prepared by a standard photolithography procedure including spin-coating a photoresist layer on the substrate 106, exposing the photoresist layer through a mask to establish a pattern, and developing the exposed photoresist layer to leave areas of the substrate 106 exposed and other areas covered with the photoresist layer. Next, the catalyst material 100 was deposited according to an embodiment of the invention described above. Finally, the remaining photoresist layer was removed with acetone.

Figure 6:
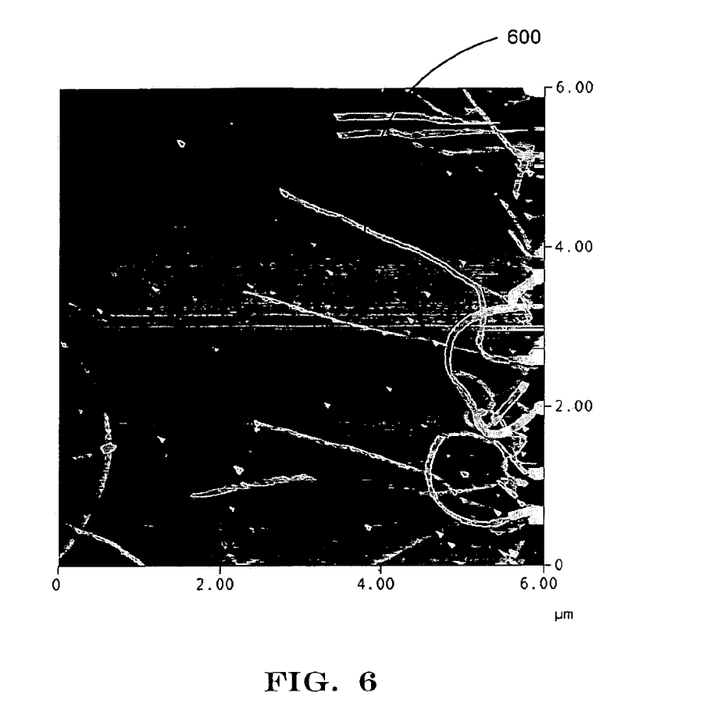
FIG. 6 is an AFM image showing nanotubes synthesized according to an embodiment of the invention.
Figure 7:
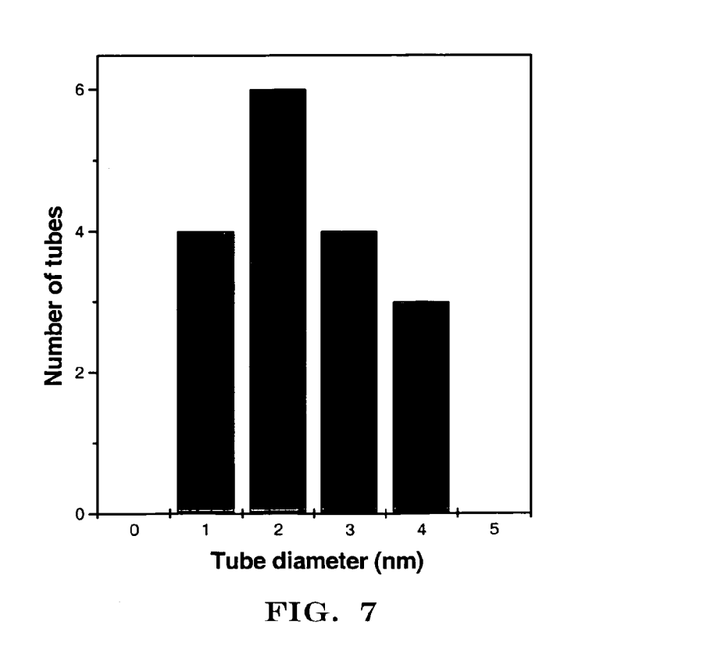
FIG. 7 is the height distribution of the nanotubes shown in FIG. 6.

FIG. 6 shows an AFM image of nanotubes grown from a catalyst material 100 produced from a patterned 20 nm thick Al/Fe/Mo precursor layer. It will be understood that only the right edge of the image in FIG. 6 shows an area in which the catalyst material 100 was patterned, while the remainder of the image shows an area that was protected by the photoresist layer during the deposition of the precursor layer. It can be seen that nanotubes 600 have grown from the catalyst material 100 into the area that was protected. An analysis of a nanotube height profile was performed using a Digital Instruments NanoScope software package, the results of which are shown in FIG. 7. From the analysis of FIG. 7 it can be seen that a majority of the nanotubes have diameters ranging from about 1 nm to about 4 nm with an average diameter of 2 nm. The narrow diameters of the nanotubes suggest that the nanotubes are mostly single-walled carbon nanotubes.

EXAMPLE 4

Figure 8A:
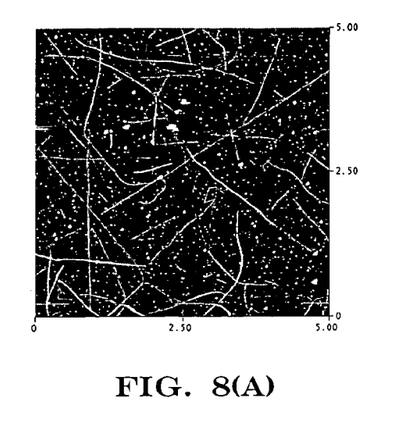
FIGS. 8(a) and 8(b) are AFM images showing nanotubes synthesized on two different catalyst materials of the invention that differ in Fe concentration.
Figure 8B:
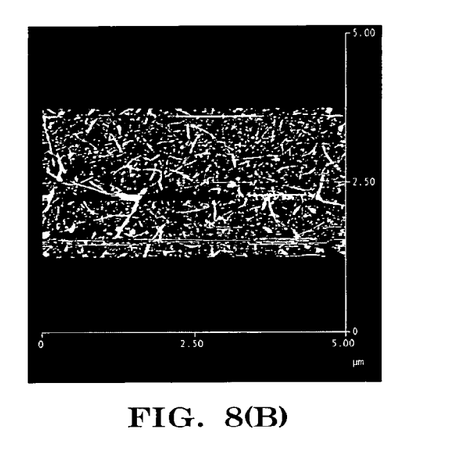

This example demonstrates the dependence of nanotube growth on both the Fe concentration in the catalyst material 100 and the thickness of the initial precursor layer. To show the dependence on Fe concentration, two precursor layers differing only in their Fe concentrations were prepared and oxidized as described above in Example 1. The two precursor layers were fabricated using 1 mm wide and 0.1 mm thick strips 400 of Fe foil on an Al target 404, one strip 400 having a length of 1.77 cm and the other strip 400 having a length of 2.54 cm. Both precursor layers were sputtered from the co-sputtering target for 30 seconds to produce 3 nm thick Al/Fe precursor layer thin films with Fe concentration of 1.3% and 2.6%, respectively. The precursor layers were heated in air at 600° C. for 30 minutes to form catalyst materials 100 by oxidizing the Al and the Fe. Afterwards, nanotubes were synthesized by CVD growth on the 1.3% Fe and 2.6% Fe catalyst materials 100. AFM images of the nanotubes grown on the 1.3% Fe and 2.6% Fe catalyst materials 100 are shown in FIGS. 8(*a*) and 8(*b*), respectively. These results indicate that a higher yield of nanotubes was obtained with the higher concentration of Fe in the catalyst material 100.

Figure 8C:
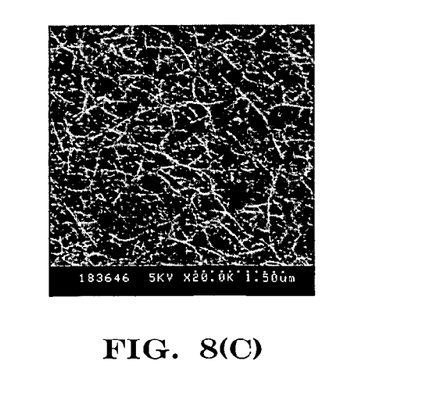
FIG. 8(c) is an SEM micrograph showing nanotubes synthesized according to another embodiment of the invention.

Additionally, a 20 nm thick Al/Fe precursor layer was prepared by co-sputtering Al and Fe as above, but for about 3 minutes rather than about 30 seconds. The precursor layer was oxidized, as above, to form a thicker precursor layer than the one used to grow the nanotubes in FIG. 8(*b*). FIG. 8(*c*) shows an SEM micrograph of nanotubes grown with the catalyst material 100 produced from the 20 nm thick Al/Fe precursor layer. Like the catalyst material 100 used to grow the nanotubes in FIG. 8(*b*), the Fe concentration in the catalyst material 100 of FIG. 8(*c*) is estimated to be 2.6%. These results indicate that a higher nanotube yield is achieved by starting with the thicker precursor layer and it is believed that the thicker precursor layer yields a higher density of host particles 104 spaced more closely together.

EXAMPLE 5

Figure 9A:
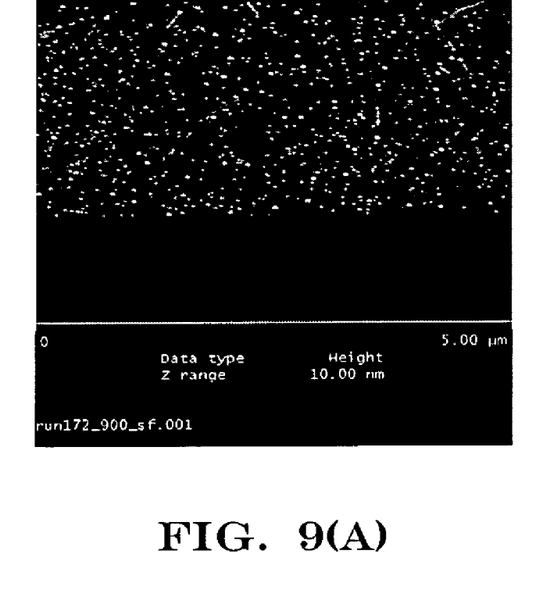
FIGS. 9(a) and 9(b) are AFM images showing nanotubes synthesized on a catalyst material of the invention at two different temperatures.
Figure 9B:
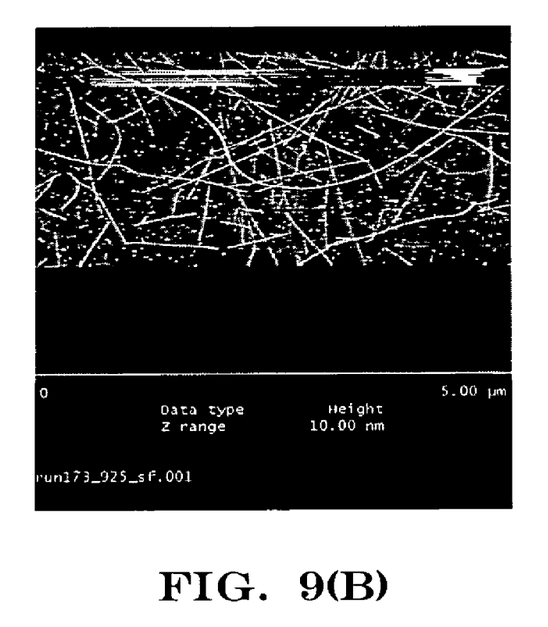

This example demonstrates the dependence of nanotube growth on temperature. A 3 nm thick Si/Fe precursor layer was prepared by co-sputtering Si and Fe with a sputtering system at a power of 50 W and a pressure of $5\times10^{-3}$ mbar for 30 seconds. A co-sputtering target was used that included a Si target with a 2.54 cm diameter partially covered by an Fe strip 400 having a 2.54 cm length, 1 mm width, and 0.1 mm thickness. Based on the relative areas of the Si and Fe on the co-sputtering target, the Fe concentration was calculated to be 1.3%. Before CVD nanotube growth, the Si/Fe precursor layer was heated in air at 900° C. for 30 minutes. FIGS. 9(*a*) and 9(*b*) show, respectively, AFM images of nanotubes grown at 900° C. and 925° C. on substrates prepared as above. Nanotubes grown on both substrates were synthesized for 10 minutes using the same gas flow rates of 1 SLM $CH_4$ and 0.5 SLM $H_2$. It can be seen that nanotube yields from the Si/Fe catalyst materials are very sensitive to growth temperature and at 900° C., the yield is very low; while at 925° C. the yield is much improved.

EXAMPLE 6

Figure 10:
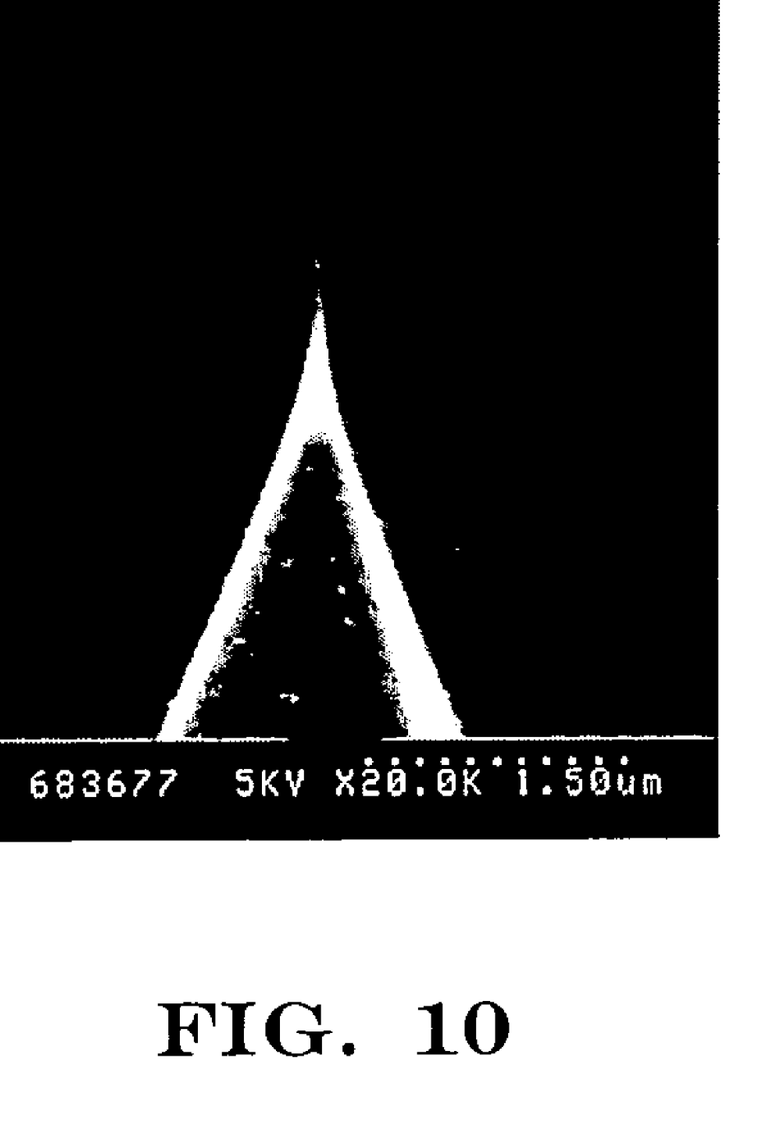
FIG. 10 is an SEM micrograph showing a nanotube synthesized on an AFM probe according to an embodiment of the invention.

A 6 nm thick Al/Fe (2.6% Fe) precursor layer thin film was prepared on an AFM probe by sputtering a co-sputtering target comprising an Al target (2.54 cm diameter) and an Fe strip 400 (2.54 cm length, 1 mm width, and 0.1 mm thick coil) with a DC sputtering system at a power of 50 W for 1 minute. The AFM probe was then heated in air at 600° C. for 30 minutes. A carbon nanotube was grown by CVD in a 6-inch furnace at 900° C. for 10 minutes with gas flow rates of 3.375 SLM $CH_4$ and 1 SLM $H_2$. FIG. 10 shows a single carbon nanotube prepared as described protruding out of the tip of the AFM probe pyramid.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for preparing a catalyst material for carbon nanotube synthesis, comprising:
    forming a precursor layer on a substrate by co-sputtering a catalytic species and a host species; and
    transforming the precursor layer to form a uniform dispersion of host particles including catalyst nanoparticles.

2. The method of claim 1 wherein transforming the precursor layer includes annealing the precursor layer in air.

3. The method of claim 2 wherein annealing the precursor layer is performed at a temperature in the range of about 400° C. to about 900° C.

4. The method of claim 2 wherein annealing the precursor layer is performed for a period of about 5 minutes to about 30 minutes.

5. The method of claim 1 wherein transforming the precursor layer includes oxygen plasma etching.

6. The method of claim 1 wherein transforming the precursor layer includes a UV ozone treatment.

7. The method of claim 1 wherein the catalytic species includes Fe, Co, Ni, Mo, W, or a combination thereof.

8. The method of claim 1 wherein the catalytic species includes an oxide of Fe, Co, Ni, Mo, W, or an oxide of a combination thereof.

9. The method of claim 1 wherein the host species includes Al, aluminum oxide, Mg, magnesium oxide, Si, silicon oxide, or a combination thereof.

10. The method of claim 1 wherein the catalytic species comprises a metal from Group VIII of the Periodic Table and a metal from Group VIB of the Periodic Table.

11. The method of claim 1 wherein forming the precursor layer includes controlling a thickness thereof according to a deposition time.

12. The method of claim 1 wherein forming the precursor layer includes controlling a composition thereof according to relative surface areas for the catalytic and host species on a co-sputtering target.

13. The method of claim 1 wherein forming the precursor layer includes patterning the precursor layer.

14. A method for preparing a catalyst material for carbon nanotube synthesis comprising:
    forming a precursor layer on a substrate by co-evaporating a catalytic species and a host species; and
    transforming the precursor layer to form a uniform dispersion of host particles including catalyst nanoparticles.

15. A method for preparing a catalyst material for carbon nanotube synthesis, comprising;
    forming a precursor layer on a substrate by electro-depositing, laser ablating, or arc evaporating a catalytic species and a host species; and
    transforming the precursor layer to form a uniform dispersion of host particles including catalyst nanoparticles.

* * * * *